US008613515B2

United States Patent
Earley (10) Patent No.: US 8,613,515 B2
(45) Date of Patent: Dec. 24, 2013

(54) LENS RECEPTOR LOCK FOR GLASSES

(75) Inventor: William J. Earley, Watkinsville, GA (US)

(73) Assignee: Tifosi Optics Inc., Watkinsville, GA (US)

( * ) Notice: Subject to any disclaimer, the term of this patent is extended or adjusted under 35 U.S.C. 154(b) by 104 days.

(21) Appl. No.: 13/291,929

(22) Filed: Nov. 8, 2011

(65) Prior Publication Data

US 2013/0114037 A1    May 9, 2013

(51) Int. Cl.
*G02C 7/02*          (2006.01)
*G02C 3/00*          (2006.01)

(52) U.S. Cl.
USPC ............................. 351/110; 351/103; 351/140

(58) Field of Classification Search
CPC ... G02C 7/02; G02C 2200/06; G02C 2200/08
USPC ............................. 351/103, 110, 159.01, 140
See application file for complete search history.

(56) References Cited

U.S. PATENT DOCUMENTS

| | | |
|---|---|---|
| 916,109 A | 3/1909 | Cook |
| 946,596 A | 1/1910 | Cook |
| RE17,994 E | 3/1931 | Emons |
| 1,987,702 A | 1/1935 | Nerney |
| 2,192,092 A | 2/1940 | Miller, Jr. |
| 2,362,725 A | 11/1944 | Slotsky |
| 2,397,243 A | 3/1946 | Cooper, Jr. |
| D150,924 S | 9/1948 | Bright |
| 2,482,664 A | 9/1949 | Gagnon |
| 2,534,655 A | 12/1950 | Baratelli |
| 2,571,704 A | 10/1951 | Gilden |
| 2,607,919 A | 8/1952 | Stegeman |
| 2,770,806 A | 11/1956 | Moeller |
| 2,825,267 A | 3/1958 | Gagnon |
| D182,459 S | 4/1958 | Eisler |
| D187,394 S | 3/1960 | Moeller |
| 3,066,573 A | 12/1962 | Moeller |
| 3,156,756 A | 11/1964 | Seaver |
| 3,233,249 A | 2/1966 | Baratelli et al. |
| 3,517,393 A | 6/1970 | Beauchef |
| 3,756,704 A | 9/1973 | Marks |
| 3,838,914 A | 10/1974 | Fernandez |
| 4,523,819 A | 6/1985 | Dianitsch et al. |
| 4,674,851 A | 6/1987 | Jannard |
| D293,450 S | 12/1987 | Jannard |
| 4,730,915 A | 3/1988 | Jannard |
| 4,824,233 A | 4/1989 | Jannard |
| 4,951,322 A | 8/1990 | Lin |
| D324,394 S | 3/1992 | Jannard |
| D331,587 S | 12/1992 | Jannard et al. |
| 5,387,949 A | 2/1995 | Tackles |
| 8,282,208 B2* | 10/2012 | Li .................................. 351/140 |
| 2010/0053545 A1* | 3/2010 | Takeshi ......................... 351/110 |

\* cited by examiner

*Primary Examiner* — Darryl J Collins
(74) *Attorney, Agent, or Firm* — Smith Risley Tempel Santos LLC; Gregory Scott Smith (57) ABSTRACT

A lens receptor that includes relief mechanism, such as a kerf-like slotted spring lock, that releases under pressure to allow the insertion of the lens and once inserted, provides sufficient force to retain the lens in position even during athletic activity. The lock includes an interior space that includes latches. The lens includes catches and detents that correspond to the latches. In operation, the lock is forced into the open position as the catches of the lens are forced to the backside of the latches, and as the lock closes, the latches are forced into the detents thereby securing the lens to the lock.

12 Claims, 9 Drawing Sheets

LENS RECEPTOR LOCK FOR GLASSES

CROSS-REFERENCE TO RELATED APPLICATIONS

This application is being filed under 35 USC 111 and 37 CFR 1.53(b), and is related to the U.S. Design application 29/405,976 filed concurrently herewith, bearing the title of SUNGLASSES, further this application includes the drawing specifications and instructional manual included in Exhibit A.

BACKGROUND

The present disclosure relates to structures for eyeglasses and sunglasses with interchangeable or removable lenses, and more particularly, to a frame and/or a receptor that can be incorporated into a frame, that receives a lens or lenses and retains the same by employing a relief mechanism, such as a kerf-like slotted springing lock.

One of the early runners in the history of sunglasses were the Inuit sun goggles made from bone, wood or hammered out seal skins and included a slit across the front to minimize the amount of light that would reach the eyes. Eyeglass and sunglass technology has advanced considerably since this time. In addition, as eyeglasses and sunglasses have been incorporated into the arena of competitive sports, where hundredths of seconds can mean the difference between a gold medal or cup of GATORADE, the precision, durability and usability of the products has greatly increased the price—although one may argue from the perspective of the animal that donated its bones to the Inuits that the price has actually gone down.

With the increase in precision, durability and price that has occurred during these technological advancements, the inventive spirit was aroused in the development of multi-purpose equipment. Initial advancements in this area included the clip-on sunglasses that allowed quick conversion between eyeglasses and sunglasses. Such advancements were quickly followed by flip-up sunglasses, shutter shades, gradient lenses and interchangeable lenses. The advantage of each of these innovative products is that a single product can be used for a variety of purposes. However, from a sporting perspective, each of these solutions has one or more pitfalls.

The present disclosure presents embodiments that provide a new, innovative solution that provides versatility in and cost effectiveness for a multi-purpose solution for glasses.

BRIEF SUMMARY

The present disclosure presents various embodiments, and aspects, functions and features thereof, of a frame for eyeglasses or sunglasses, and/or a receptor that can be incorporated into such a frame, and that is suitable for receiving and holding inserted lenses. Further, the present disclosure presents embodiments of interchangeable lenses that can be utilized in conjunction with various embodiments of the frame and/or receptor. More specifically, the present disclosure presents a receptor design for incorporating into a glasses frame that includes a relief-locking mechanism. The relief allows the receptor to open when receiving a lens and then close and lock the lens into position. In an exemplary embodiment, the relief-locking mechanism may include a kerf-like slotted spring lock. The kerf-like slotted spring lock releases under pressure to allow the insertion of a lens and once inserted, provides sufficient force to retain the lens in position even during athletic activity. The lock receives a portion of a lens into an interior space that includes one or more latches to hold or lock the lens into place. It should be appreciated that the term lock is being used to describe the securing of the lens to the receptor in a manner to hold the lens in position under normal use conditions. The kerf-like slots in the walls of the receptor enable the lock to be forced open thereby allowing the insertion of the lens. The lens has a connection element that includes one or more catches and detents that correspond to the one or more latches in the receptor. In operation, the lock is forced into the open position as the catches of the lens are forced into the receptor and to the backside of the latches, and as the lock closes, the latches are forced into the detents thereby securing the lens to the lock.

These and other embodiments and elements are further described in the detailed description of the various embodiments.

BRIEF DESCRIPTION OF THE SEVERAL VIEWS OF THE DRAWING

FIGS. 2A-2G, collectively referred to as FIG. 2, illustrates various views of an exemplary hinge element incorporating an exemplary embodiment of the kerf-like slotted spring lock.

FIG. 5 presents various views of an exemplary bridge that can be attached to a lens or lenses with FIG. 5A being a side view of the exemplary bridge showing a nose pad and a lens edge holder, FIG. 5B being a topside view of the exemplary bridge illustrated in FIG. 5A and FIG. 5C being a front side view of the bridge illustrated in FIG. 5A.

DETAILED DESCRIPTION OF EMBODIMENTS

The present disclosure presents various embodiments, as well as features, aspects and elements that can be incorporated into the various embodiments, of a receptor that includes a relief mechanism for receiving and then securing of a lens in the receptor. Further, the present disclosure presents various embodiments of such a receptor including an embodiment in which the relief mechanism includes a kerf-like slotted spring lock for receiving a lens, a frame employing such lock and a lens suitable for insertion in such lock.

Figure 1:
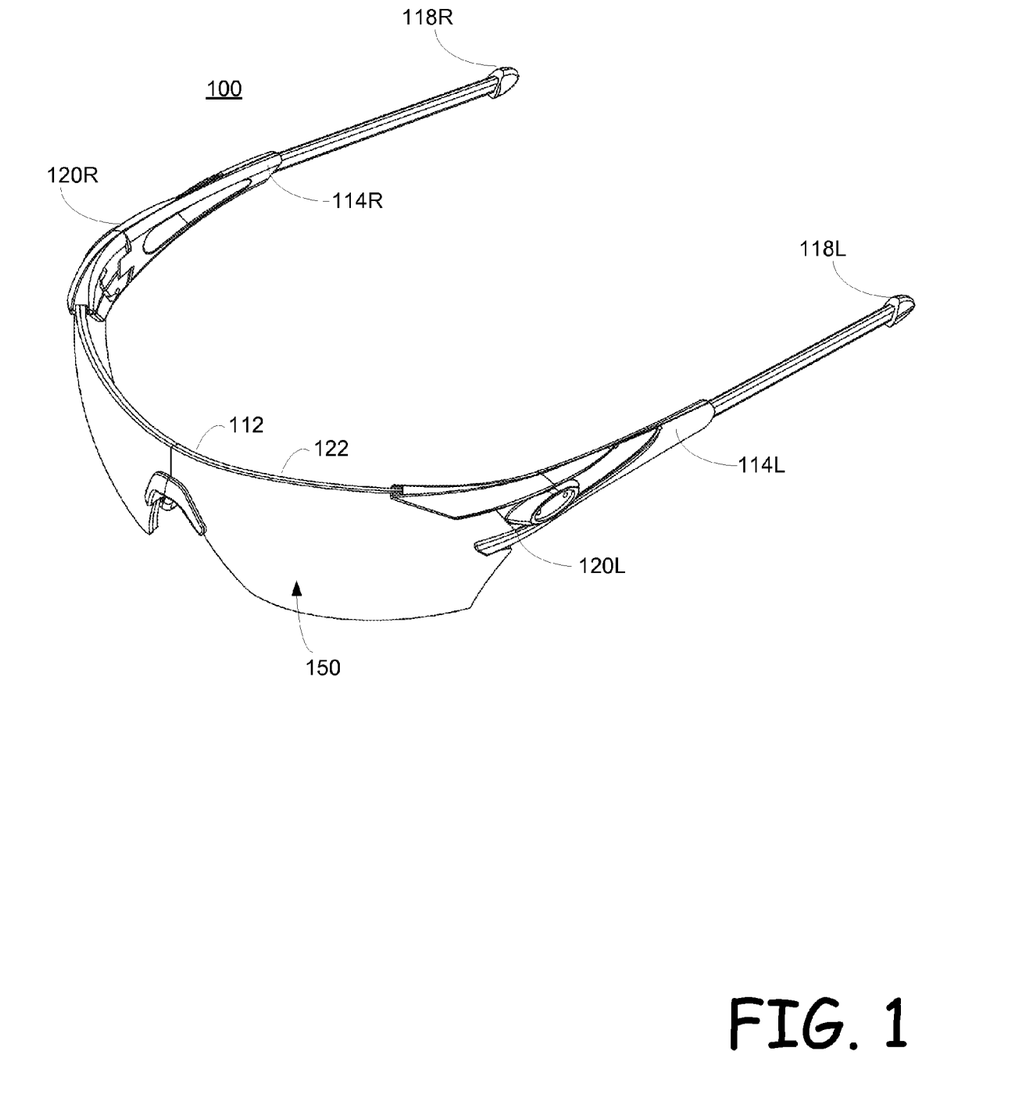
FIG. 1 is a perspective view of a pair of glasses with a lense and frame that is a suitable environment for and/or represents an exemplary embodiment of the glasses frame with a kerf-lie slotted spring lock for receiving a lens.

FIG. 1 is a perspective view of a pair of sunglasses with lens(es) and a frame that is a suitable environment for and/or represents an exemplary embodiment of the glasses frame with a kerf-like slotted spring lock for receiving a lens. FIG. 1 illustrates a pair of sunglasses or eye glasses 100 that includes a frame 110 and lens(es) 150. It should be appreciated that within this disclosure, the term glasses will be used to refer to any form of glasses including eyeglasses, reading glasses, sunglasses, protective glasses, sportswear glasses, goggles, or the like. The glasses frame 110 includes a bridge 112, a set of ear stems 112L and 112R on the left and right side of the frame 110 respectively, tips 118L and 118R on respective ends of the ear stems, and temples 120L and 120R which serve as the connection between the ear stems and a rim 122 and/or lens 150. It should be appreciated that in some embodiments, the rim 122 is used to hold the lens in place. However, many glasses are structured as rimless glasses. Rimless glasses basically include a technique for the lens or lenses to be mounted to the temples and the lens either spans the front of the glasses as a unitary lens from temple to temple or, utilizes the bridge or rim to serve as a middle connection between split or two piece lenses (dual lenses). Although in some embodiments of glasses the temples include a hinge element and hence are referred to as hinges rather than temples, throughout this disclosure the portion of the frame 110 that is proximate to the end of the ear stem 120 that is distal from the tip 118 will generally be referred to as the temple element, regardless of whether the glasses include or do not include a hinge. Thus, the term temple is used to identify the portion of the frame that either connects to the rim 122 and/or directly to the lenses 150 and connects to the arms or ear stems 112.

In one embodiment of the kerf-like spring lock, the lock operates as a receptor, which can be incorporated into the temple element of a pair of glasses. The receptor includes a housing that is constructed of an inside wall and an outside wall. For purposes of illustration, the inside wall is the wall that is located on the inside of the frame of the glasses (the side that is facing or proximate to the wearer's face) and the outside wall faces away from the wearer or is distal to the wearer's face. The inside and outside walls cooperate to define an interior space or a void for receiving a connection element of a lens. Further, at least one latch is located within the interior space. The surface or contour of the lens defines a detent proximate to the connection element of the lens. When the connection element is placed within the interior space of the receptor, the latch aligns with the detent to help secure the lens into position. Further, embodiments may include a second latch on the interior of the receptor and the lens can define a second detent for further securing the lens into position.

In various embodiments, the temple element with the included lock or receptor includes a stem receiving end at which an ear stem can be attached, and a lens receiving end. The edges of the inside wall and the outside wall at the lens receiving end cooperate to define an opening into the void for receiving the connection element of the lens. Further, at least one of the inside and outside housing walls includes at least one relief mechanism, such as a kerf-like slot. For instance, the kerf-like slot can run from the edge of the wall on the end that receives the lens, and substantially in the direction of the step end of the temple element. The length, width and shape of this kerf-like slot can vary among embodiments but in an exemplary embodiment, the length of the slot may range from approximately ¼ of the length of the housing or temple element to ¾ or more of the length of the housing. Further, in an exemplary embodiment the width of the slot may range from 1/16 to ¼ of an inch. However, in other embodiments, other distances and widths are also anticipated. In general, the kerf-like slot is configured such that it enables an upper portion of the wall to be moved in the opposite direction from a lower portion of the wall thereby increasing the size of the opening into the void. However, it will be appreciated that in other embodiments, other movements of the various elements of the temple may be moveable in other directions to enable the entry of the lens.

In various embodiments, the housing of the receptor is configured such that, upon placement of the connecting element of the lens into the void and causing one of the latches to be forced towards a lens detent, a force can be applied to the lens in the direction of the other latch to cause a catch on the lens to come in contact with the other latch and force the upper portion of the wall to be moved in an opposing direction from a lower portion of the wall thereby increasing the size of the opening into the void.

Other embodiments include a glasses frame that includes a receptor for receiving and securely retaining lenses, while still allowing the lens(es) to be removed and/or replaced by other lenses. Thus, lenses with varying tints, varying colors, varying shapes, varying prescriptions, etc. can be inserted into the same frame. The frame includes two arm elements or ear stems and two temple elements. Each of the temple elements include an ear stem interface and a lens interface on the opposing end of the temple element from the ear stem interface. The ear stem elements are attached to the ear stem interface of the temple element. The glasses further include a bridge and one or more lens elements. The lens element, which may include one lens to cover both eyes (unitary lense) or two lenses (dual lenses), one for each eye, includes a connecting portion corresponding to each of the temple elements. Thus, in typical embodiments, a unitary lens will include two connecting portions, where as the use of two lenses will have at least a single connecting portion on each lens.

In some embodiments, each temple element includes a first exterior wall and a second exterior wall that cooperatively define an interior space and an opening into the interior space, and wherein the interior space includes at least two latches. The connecting portion of the lens element includes at least two catches with each catch corresponding to one of the at least two latches in the temple element. Further, the connecting portion also includes or defines at least one detent associated with one of the catches. Upon placement of a first catch of the connecting portion through the opening and towards the first latch, pressure can be applied to the lens to force the second catch toward a second latch. When the second catch contacts the second latch, this force causes the displacement of the second latch relative to the first latch, such that the second catch can pass to the back side of the second latch thereby allowing the second latch to enter the detent and securing or locking the lens element to or within the temple element. To further facilitate the movement of the latches relative to each other, one or more walls of the temple element may include a relief mechanism, such as a kerf-like slot or other mechanisms. The kerf-like slot can take on a variety of forms, and in one embodiment it includes a lateral slot that begins at the edge of the lens interface of an exterior wall of the temple element and extends towards the ear stem end of the temple element. Further, the kerf-like slot may include a vertical slot that is substantially perpendicular to the lateral slot and that intersects with the lateral slot. The intersection may take on the form of the two slots crossing each other or, may simply be an adjoining of one slot with the next in a "T" like configuration. Even further, the vertical slot of the kerf-like slot may include a hole or void that is substantially wider than that vertical slot.

FIGS. 2A-2G, collectively referred to as FIG. 2, illustrates various views of an exemplary temple element incorporating an exemplary embodiment of the kerf-like slotted spring lock. As is known in the art, a kerf is a slot, void or groove that is created in an object, such as a piece of wood or plastic, that enables the object to have a level of flexibility or displacement not otherwise available. For instance, including a series of side-by-side parallel kerfs in a piece of wood, the generally rigid structure of the piece of wood can actually be curved around a radius. The kerf-like slotted spring lock operates on the same principle as a kerf. In general, the temple element is designed such that in a steady state (i.e., no forces being exerted against the lock) the lock remains in a closed position and upon the application of a force, the lock can be temporarily displaced or forced open, such state lasting only as long as the force is present. The term kerf-like then is defined for purposes of this description as any aperture, slot, slit, opening, weakening, etc., whether cut, sawn, molded, etc., that is included in an object to allow portions of the object to be displaced or become more flexible and, maintaining a memory force to cause the object to return to a steady state of fail state when the forces causing the displacement are removed.

Figure 2A:
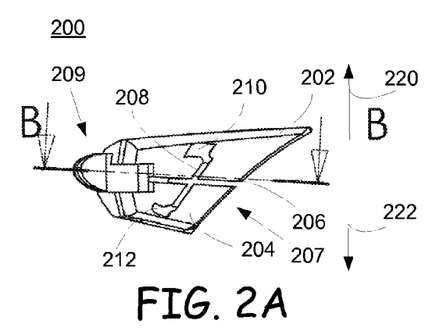
FIG. 2A illustrates an inside side view of a hinge element incorporating one embodiment of the kerf-like slotted spring lock.
Figure 2B:
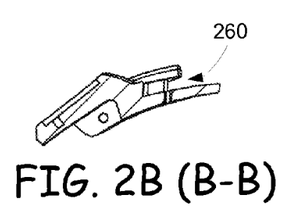
FIG. 2B (B-B) is a cross-sectional view of the hinge element illustrated in FIG. 2A taken at line B-B.

More particularly, FIG. 2A illustrates an inside side view of a temple element incorporating one embodiment of the kerf-like slotted spring lock (referred to as a "lock"). The inside side view refers to the side of the temple that faces the wearer's head when the glasses are being worn. The illustrated embodiment of the lock includes an upper portion 202 and a lower portion 204. The upper portion 202 and the lower portion 204 are partially segmented from each other by slot 206 which traverses substantially horizontally from a lens 150 receiving end 207 of the temple element 200 towards the ear piece 114 receiving end 209 of the temple element 200. When no force is being applied to the upper portion 202 and/or the lower portion 204, the lock rests in the closed position as illustrated in FIG. 2A. However, upon the application of forces in the approximate directions of 220 and/or 222 to the upper portion 202 and/or lower portion 204 respectively, the upper portion 202 and the lower portion 204 are forced to move away from each other thereby widening the slot 206.

The mobility of the upper portion 202 and the lower portion 204 can be further increased by including a substantially vertical slot 208 in the wall of the temple element 200. The substantially vertical slot 208 is shown as running substantially perpendicular to slot 206 (although other orientations are also anticipated), with one end of slot 206 extending into the upper portion 202 and another end of the slot 206 extending into the lower portion 204. It should be appreciated that in some embodiments, only the single slot 206 is required. In other embodiments, both the slots 206 and 208 can be included wherein the slot 208 can exist in both the upper portion 202 and lower portion 204, or just in either the upper portion 202 or lower portion 204. Further, the orientation of the substantially horizontal slot 206 and substantially vertical slot 208 can vary from embodiment to embodiment and the illustrated configuration is simply one non-limiting example. The slots 206 and 208 are described herein as being kerf-like in that the existence of the slot allows the upper portion 202 and the lower portion 204 to move away and towards each other in a spring-hinged like fashion. However, rather than being cut into the surface of the hinge, the kerfs can be molded, cut, laser cut, or otherwise created in the hinge.

FIG. 2A further illustrates an enlarged void existing at each end of the substantially vertical slot 208. The upper void 210 exists within the upper portion 202 of the temple element 200 and the lower void 212 exists within the lower portion 204 of the temple element 200. The voids provide additional flexibility in the movement of the upper portion 202 and the lower portion 204 and/or operate to reduce the amount of force required to displace the upper and/or lower portions. The shape and size of the upper and lower void 210 and 212 can vary from embodiment to embodiment and are selected such that the force required to move the lock open is not excessive, yet the force required to displace the lock from its steady state is significant enough to avoid inadvertent openings of the lock.

Figure 3A:
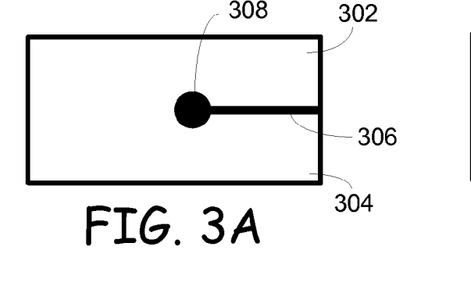
FIGS. 3A-3H illustrate a few non-limiting examples of kerf-like configurations.
Figure 3B:
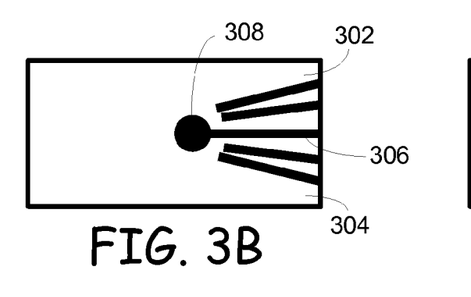
Figure 3C:
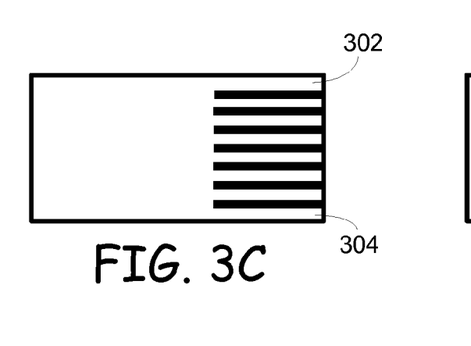
Figure 3D:
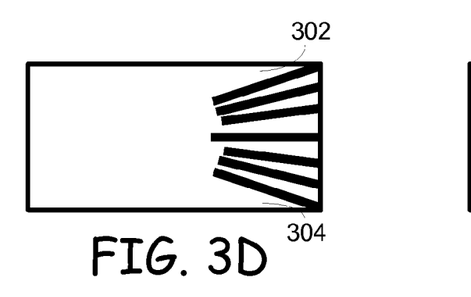
Figure 3E:
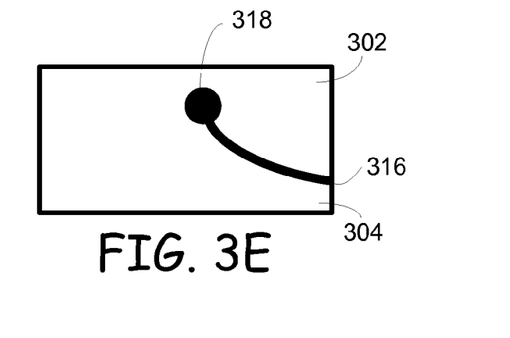
Figure 3F:
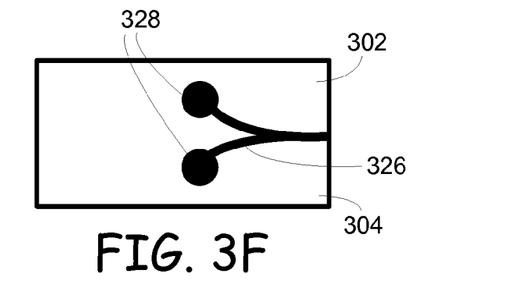
Figure 3G:
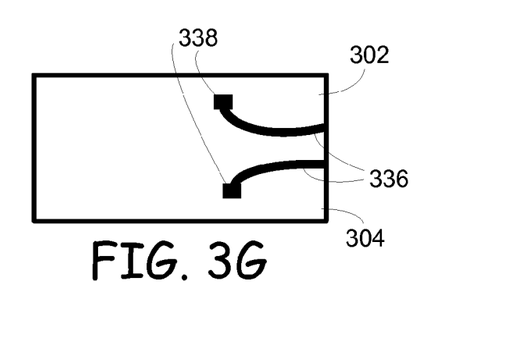
Figure 3H:
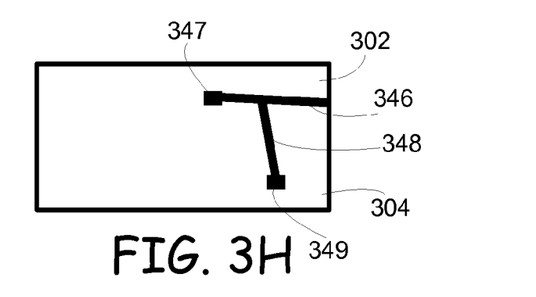

In other embodiments, various kerf-like configurations can be used to provide the necessary flexibility in the lock. FIGS. 3A-3H illustrate a few non-limiting examples of other kerf-like configurations that could be utilized in various embodiments. For instance, in FIG. 3A, a simple void 308 with a slot 306 extending from the lens edge of the hinge to the void. This configuration allows the upper portion 302 and the lower portion 304 to be forced apart with the void 308 and slot 306 operating as a spring like hinge. FIG. 3B includes additional kerf-like slots above and below the slot 306 to provide greater flexibility in the upper portion 302 and lower portion 304 relative to each other. FIG. 3C includes a series of seven (7) parallel kerfs that operate similar to normal kerf structures to allow the upper portion 302 and lower portion 304 to be forced apart. FIG. 3D is similar in structure to FIG. 3C with the exception that the kerfs are not parallel, but rather are positioned on the temple in a radial fashion. FIG. 3E is similar in structure to the structure illustrated in FIG. 3A with the exception that the slot 326 is curved from the lower portion 304 up towards a void 318 existing in the upper portion 302. FIG. 3F further modifies the structure of FIG. 3E by including two voids and two curved slots that meet at the lens edge of the temple element. FIG. 3G is a variation from FIG. 3F in that the curved slots 336 do not meet at the lens edge of the hinge but rather are located apart from each other. Further, the voids are illustrated as being rectangular to illustrate that the voids can have a variety of shapes. FIG. 3H illustrates yet another configuration in which a substantially horizontal slot 346 intersects with a substantially vertical slot 348 to form a "T" shape as in the TIFOSI OPTICS logo. The ends of the substantially horizontal slot 346 and the substantially vertical slot 348 terminate respectively at voids 347 and 349. It should be appreciated that the illustrated configurations are provided for the purpose of non-limiting examples only and that other configurations are also anticipated by the present disclosure.

Figure 2C:
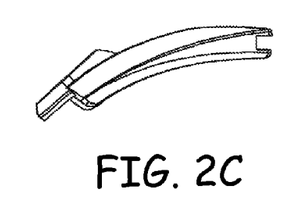
FIG. 2C is a top-side view of the hinge element illustrated in FIG. 2A.
Figure 2D:
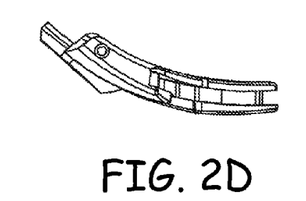
FIG. 2D is a bottom side view of the hinge element illustrated in FIG. 2A.
Figure 2E:
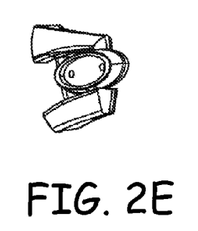
FIG. 2E is a perspective view of the temple end of the hinge element illustrated in FIG. 2A.
Figure 2F:
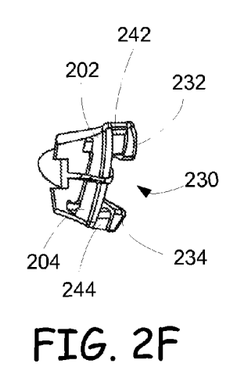
FIG. 2F is a perspective view of the lens end of the hinge element illustrated in FIG. 2A.
Figure 2G:
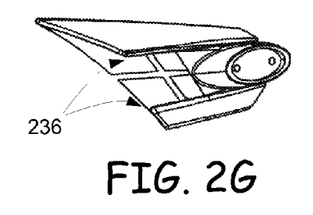
FIG. 2G illustrates an outside side view of the hinge element of FIG. 2A.

Returning to FIG. 2, FIG. 2B (B-B) is a cross-sectional view of the temple element illustrated in FIG. 2A taken at line B-B. FIG. 2C is a top-side view of the temple element illustrated in FIG. 2A. FIG. 2D is a bottom side view of the temple element illustrated in FIG. 2A. FIG. 2E is a perspective view of the ear stem end of the temple element illustrated in FIG. 2A and FIG. 2F is a perspective view of the lens end of the temple element illustrated in FIG. 2A. FIG. 2G illustrates an outside side view of a temple element of FIG. 2A. Referring further to FIG. 2F, the lens end of the temple element 200 is illustrated as including an opening 230 that is defined by the upper portion 202 and the lower portion 204 of the inside side wall of the temple element, and corresponding upper portion 232 and lower portion 234 of the outside side wall of the hinge 200. In the illustrated embodiment, on the outside surface of the temple element, a large gap 236 is shown as existing between the upper portion 232 and the lower portion 234 (best illustrated in FIG. 2G). The gap 236 further enables the movement of the upper portions 202 and 232 away from the lower portion 204 and 234. It should be appreciated that in some embodiments, both the outside wall and the inside wall may include kerf-like structures and in other embodiments, only one of the walls may include a kerf-like structure.

Still referring to FIG. 2F, inside the opening 230, positioned between the upper portion 202 of the inside wall of the temple element and the upper portion 232 of the outside wall of the temple element is a latch 242. Similarly, inside the opening 230, positioned between the lower portion 204 of the inside wall of the temple element and the lower portion 234 of the outside wall of the temple element is latch 244.

Figure 4A:
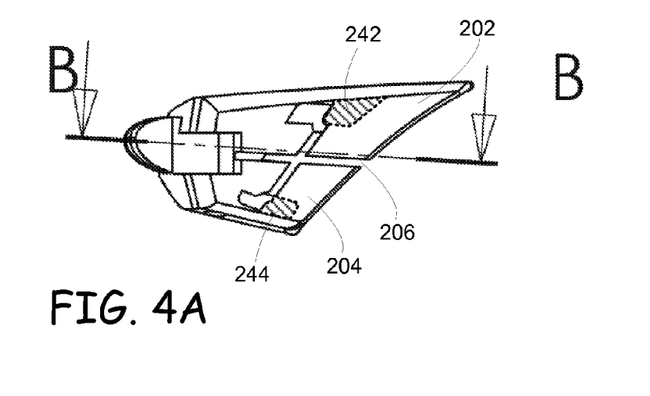
FIG. 4A illustrates an inside side view of a hinge element incorporating one embodiment of the lock and including a view of the hidden latches on the interior of the lock.
Figure 4B:
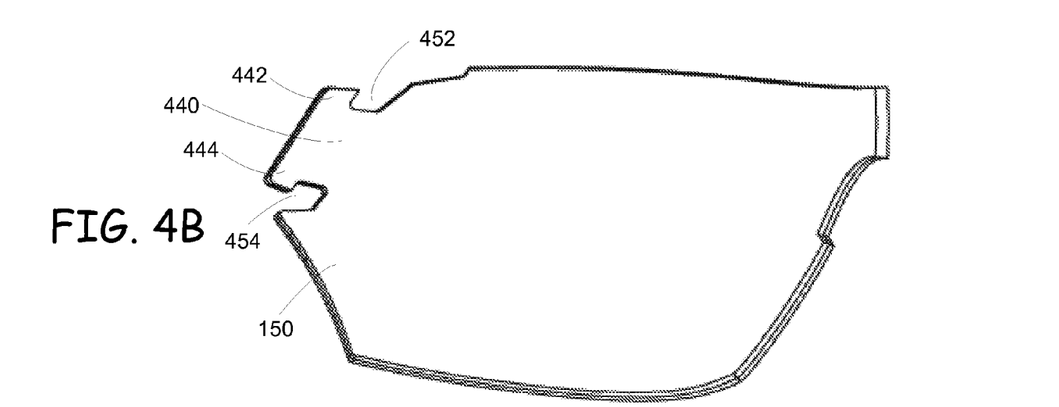
FIG. 4B is a view showing the outline of an exemplary lens.
Figure 4C:
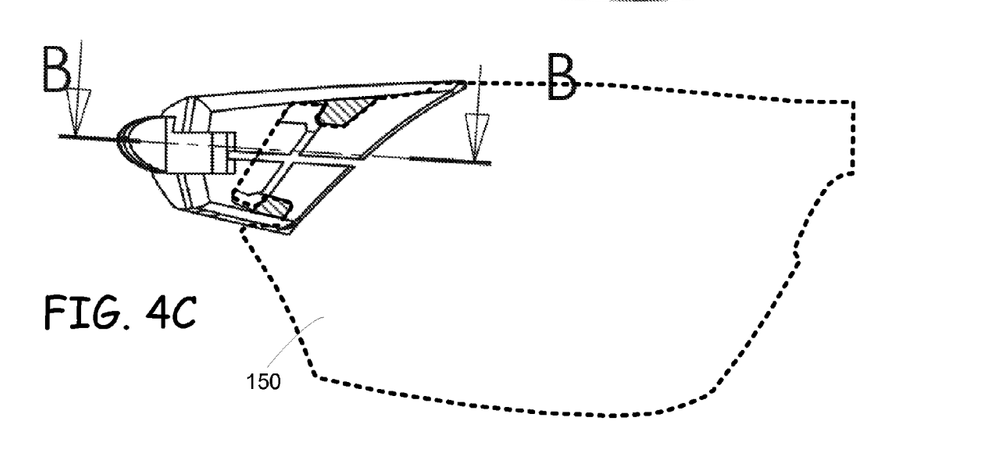
FIG. 4C illustrates a hinge element with a lens installed within the lock.
Figure 4D:
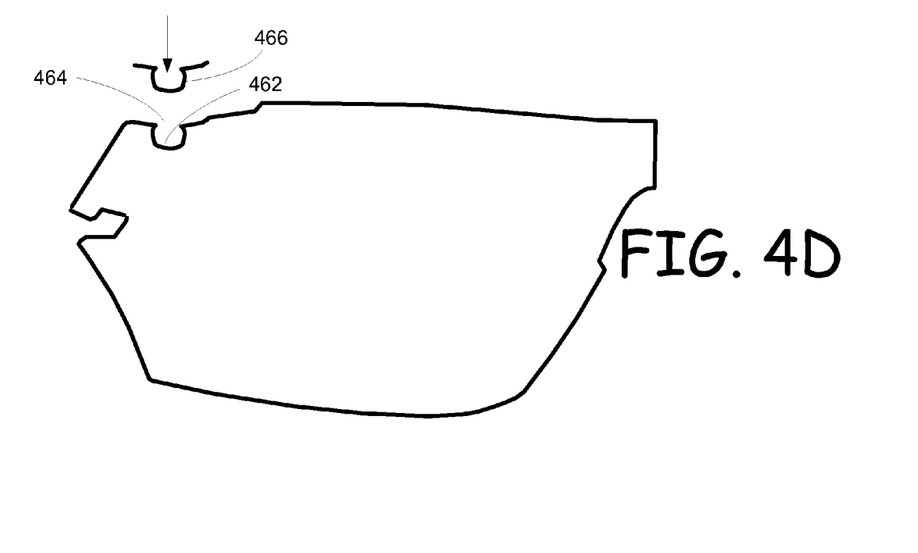
FIG. 4D illustrates a snap-like configuration for a latch and detent.
Figure 4E:
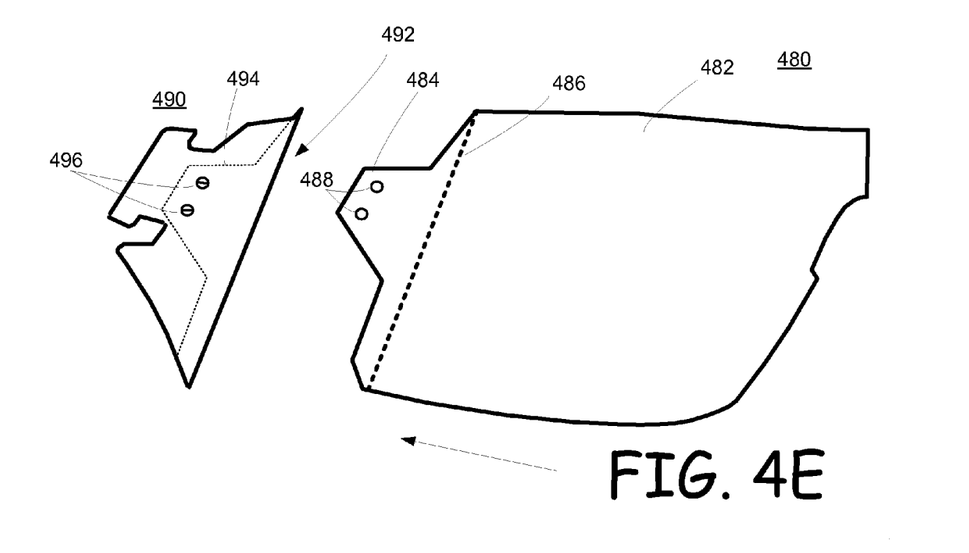
FIG. 4F illustrates an interim step of installing a lens into a lock.
FIG. 4G shows another exemplary embodiment in which the latches 242' and 244' are shown as being ramped to further facilitate installation of the lens.
FIG. 4H illustrates another variation that can be included in other embodiments including a relief mechanism on a lens.
FIG. 4I also illustrates the incorporation of a relief mechanism into a two-piece lens structure in which the lens connector can be attached to the lens.
Figure 4F:
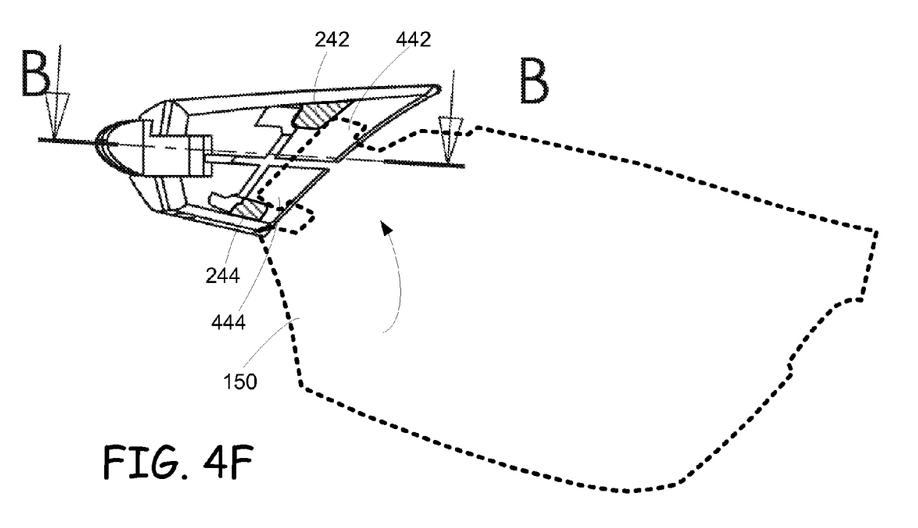
Figure 4G:
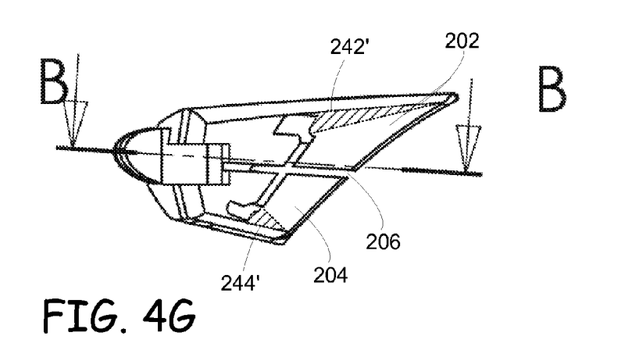

FIG. 4A illustrates the temple element of FIG. 2A with one exemplar embodiment of the latches 242 and 244 being shown. The latches 242 and 244 are shown with dotted outlines and hash shading. FIG. 4G shows another exemplary embodiment in which the latches 242' and 244' are shown as being ramped to further facilitate installation of the lens. FIG. 4B is a view showing the outline or shape of an exemplary lens 150. The lens 150 is shown as including a "T" shaped connecting element with an upper flange 442 and a lower flange 444 that extend in opposing directions from a stem 440 extending from the main body of the lens. However, it should be appreciated that relative positioning of the flanges and stem may take on a variety of other shapes such as an umbrella, a "Y", etc. as non-limiting examples. The upper flange 442 and the upper portion of the lens 150 define a detent 452 that is similarly shaped to the lower portion of the latch 242. Further, the lower flange 444 and the lower portion of the lens 150 define a detent 454 that is similarly shaped to the upper portion of the latch 244.

In operation, the lens 150 is inserted into the receptor lock by sliding the latch 444 through the opening 230 and towards the backside of the latch 244. When the lens is thus inserted into the receptor lock, the lens is angled downward such that the catch 442 is in front of the latch 242 as shown in FIG. 4F. The angle of the lens 150 can then be decreased by applying pressure to force the catch 442 against the latch 242, thereby causing the upper portion 202 to move away from the lower portion 204 as the width of the slot 206 increases. The force may also cause the slot 208 to widen as the upper portion is flexed a sufficient amount to allow the catch 442 to pass below the latch 242 such that the latch 242 can then slide into the detent 452 thereby returning the lock to its steady or resting state. FIG. 4C depicts the lens 150 as being fully inserted into the receptor lock with the latch 242 resting in the detent 452 and the latch 244 resting in the detent 454.

The material utilized to construct the temple element or receptor is a flexible and resilient plastic, composite or other material that will retain the memory of its steady state and return to such state upon the removal of the forces causing the upper portion 202 and the lower portion 204 to move away from each other. A few non-limiting examples of such materials include polycarbonates, glass, plastic, zylonite, metals, alloys, composites, etc. In some embodiments, the material used to construct the temple element is softer or more malleable than the material used to construct the lens. In other embodiments, the softness, rigidity and malleability of the materials is not relevant because the kerf-like slots create any required flexibility in the hinge element.

To remove the lens 150 from the receptor lock, the lens 150 can be forced in the direction 222 (see FIG. 2A), thereby causing the catch 442 to apply force to the latch 244 and force the upper portion 202 to move away from the lower portion 204. An individual may also apply direct force to the upper portion 202 to help facilitate the removal of the lens by causing the upper portion 202 to move further away from the lower portion 204. Once the latch 244 vacates the detent 452, the catch 444 can be lifted upwards and away from the temple element thereby causing the latch 244 to vacate the detent 454 and catch 444 to slide from behind the latch 244. The upper portion 202 and lower portion 204, upon removal of any applied forces, then returns to its steady state condition.

It should also be appreciated that the lens can be attached to the receptor lock by first inserting the catch 442 through the opening 230 such that the latch 242 settles within or proximate to the detent 452 and then applying a downward-lateral force to cause the catch 444 to displace the lower portion 204 of the receptor lock 200 relative to the upper portion 202 as the catch 444 slides over the latch 244. Further, a user may simply apply opposing forces to the upper portion 202 and lower portion 204 to force the opening 230 to widen and then simply slide the catches 442 and 444 past the latches 242 and 244 respectively. Upon releasing of the opposing forces, the latches 442 and 444 would settle into the detents 452 and 454 respectively.

It should be appreciated that the illustrated configuration in FIGS. 4A-4C is a non-limiting example of one embodiment that incorporates or utilizes the receptor lock. Other variations may also be included in which the particular shapes, sizes, orientations, etc. of the lens, the latches, the catches and the detents are modified. As non-limiting examples, the latches can be more rounded to help facilitate the entry of the lens into the receptor lock. Further, the detents can be more pronounced by deepening and/or widening the detents, or the detents can be configured to be more shallow and/or narrow. Likewise, the size of the latches can be modified accordingly to ensure a tighter fit with the detents.

In the illustrated embodiment, the latches 242 and 244 are offset from the edge of the lens side edge of the hinge lock (i.e., set back into the interior of the void). Advantageously, this offset allows the catches of the lens, as well as a portion of the lens, to be inserted within the hinge lock and thus provides a more secure and stable interface with minimal wobble.

Further, in some embodiments the gap 236 may be reduced to provide further structural support to the lens by extending the surface area of the receptor lock that covers and comes in contact with the lens. In addition, the size of the gap 260 between the inner surfaces of the inside side and outside side of the receptor lock can be configured to snuggly fit the width of the lens. This gap 260 houses the latches 242 and 244 and receives the lens between the inner surfaces. Thus, if the width of the gap 260 is configured to be slightly smaller than the width of the lens at steady state, then once the lens is installed in the receptor lock, the inner surfaces of the gap 260 will apply pressure to the surface of the lens and thus provide frictional support for holding the lens in position. Further, in some embodiments the inner surface of the gap 260 and/or the surfaces of the catches of the lens and the edges of the detents can be structured to provide additional frictional support by including ridges, or roughened surfaces.

It will be appreciated that in the illustrated exemplary embodiment, the detent 454 is illustrated as being a "snap-like" structure in that the opening into the detent 454 is slightly smaller than the largest diameter of the detent 454 and the diameter of the latch 244 that is inserted into the detent 454. Thus, an amount of pressure is required to force the catch 244 into the detent 454. Other configurations of this "snap-like" feature may be employed for both the upper detent 452 and/or the lower detent 454. FIG. 4D illustrates a non-limiting example of an alternative approach from providing a "snap-like" structure. In the illustrated embodiment, the detent 462 is substantially rounded with the opening 464 being slightly less than the largest width of the rounded detent 462. The latch 466 is shown as being similarly shaped as the detent 462 and the dimensions of the latch 466 is approximately equal to the interior dimensions of the detent 462. Thus, in operation, the latch 466 can be forced through the opening 464 and into the detent 462 thereby creating a snap-like attachment. It will be appreciated that the material used to create the latch may include elastic properties allowing the latch 466 to be compressed during entry into the detent 462 but then quickly returning to its normal, steady state shape or non-compressed state once entered into the detent 462. In typical embodiments, the lens is constructed of a polycarbonate material and is thus rather rigid. However, in other embodiments, the material used to fabricate the lens, or at least the portion of the lens being inserted into the receptor lock may likewise or alternatively include elastic properties thereby allowing it to be deformed during assembly and then return to its steady state.

In some embodiments, the lens may include the components of an eye lens, and a connecting portion. In the embodiments illustrated thus far, the lens has been shown as a unitary piece including either a single lens or a lens that encompasses both eyes. However, in some embodiments the lens may include an attachable connector that can either be fixedly attached to the lens or attachable and removable from the lens. FIG. 4E illustrates a lens that includes an attachable connector. In the illustrated embodiment, the lens 480 includes a lens portion 482 that is intended to be positioned over a wearer's eyes, and then an extended portion 484. Further the illustrated embodiment depicts a connector 490 that includes an opening 492 and the catch structure as depicted in FIG. 4B and described in conjunction with the description of FIG. 4B. In operation, the lens 480 can be adjoined to the connector 490 by sliding the extended portion 484 of the lens through the opening 492 until the connector 490 fits snuggly over the lens 480 and the connector 490 rests along the area depicted by broken line 486 and the extended portion 484 of the lens 480 penetrates to the position depicted by broken line 494. In some embodiments the lens 480 can then be permanently secured to the connector 490 such as by glue, heat weld, etc. In other embodiments, as depicted in FIG. 4E the lens 480 can be removeably attached to the connector 490 by various means, such as screws 496 being inserted through the connector 490, through the lens holes 488 and screwed into the back side of the hinge lock or a nut. This latter embodiment advantageously enables the lens to be repaired if damage to the connector component of the lens is incurred due to excessive wear, or otherwise or if the lens is scratched. Such embodiments allow the lens or connector to be replaced independently. In addition, rather than the connector 490 defining an interior for receiving the extended portion 484 of the lens, the connector may simply mount to the surface of the lens. In addition, the surface of the connector 490 may include a recessed area for receiving the lens.

Figure 5A:
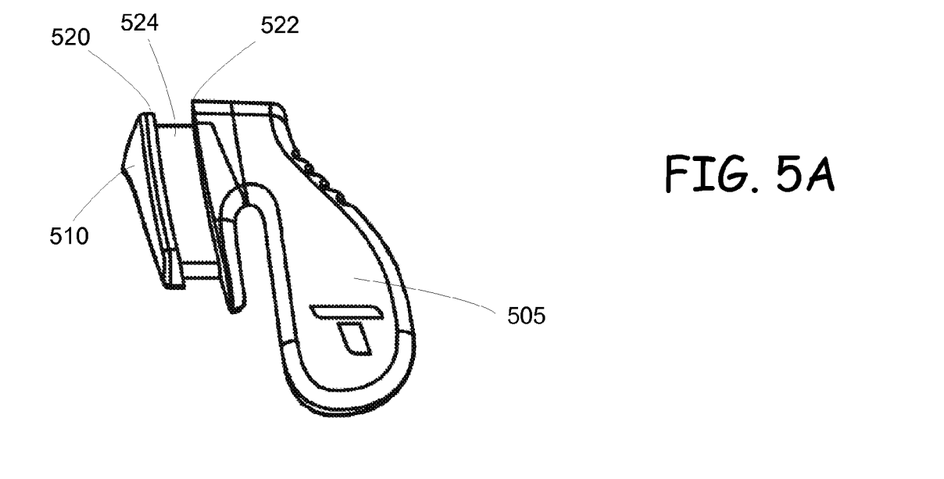
Figure 5B:
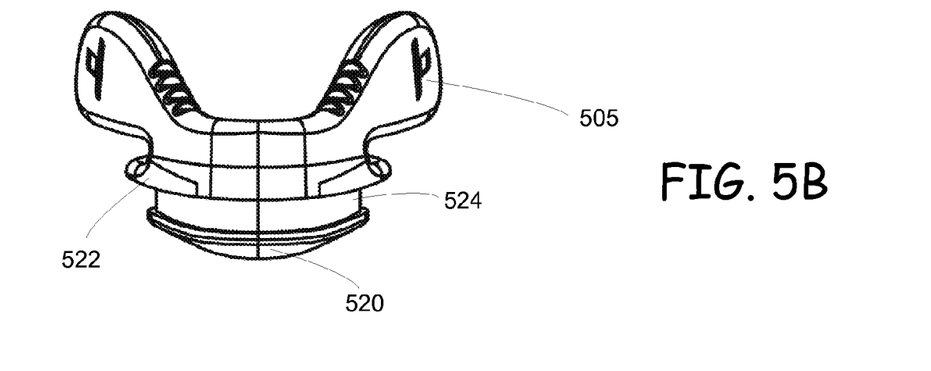
Figure 5C:
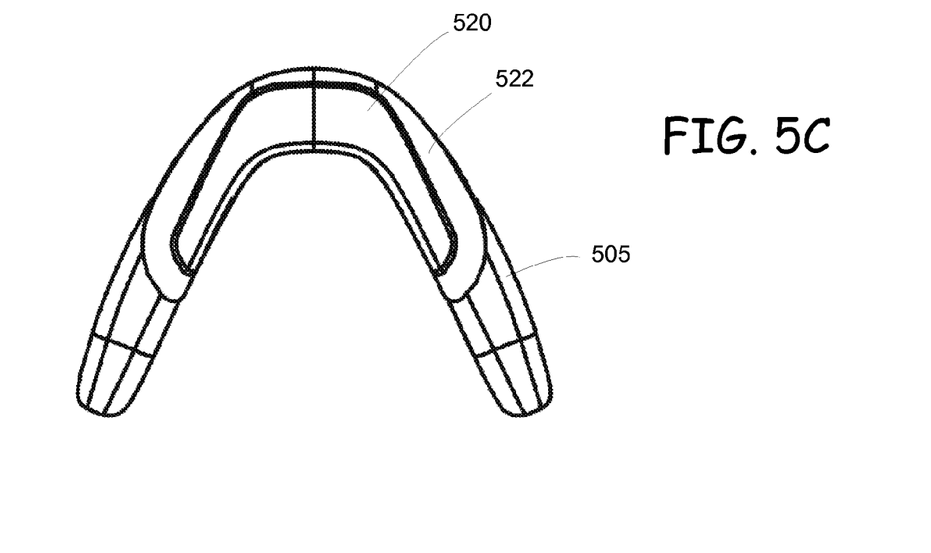

In various embodiments, the lens 150 may be a unitary lens that extends over both eyes or, may include two separate lenses, one for the left 150L and one for the right 150R. FIG. 5 presents various views of an exemplary bridge 122 that can be attached to lens 150 or lenses 150L and 150R. FIG. 5A is a side view of the exemplary bridge 112 and includes a nose pad 505 and a lens edge holder portion 510. FIG. 5B is a topside view of the exemplary bridge illustrated in FIG. 5A. FIG. 5C is a front side view of the bridge illustrated in FIG. 5A. The lens edge holder portion 510 includes a forward flange 520 and a rear flange 522 that define a lens edge channel 524 that is configured to receive and hold the lens 150. In one embodiment, the forward flange 520 and the rear flange 522 may be configured such that the bridge 122 is frictionally secured and held to the lens 150 when placed therein. In other embodiments, other mechanisms may be utilized to secure the lens 150 to the bridge 122. For instance, the lens may include one or more detents and the forward flange 520 and/or the rear flange 522 may include one or more protrusions corresponding to the detents and thereby securing the lens 150 to the bridge 122. In other embodiments, a lock structure similar to that employed in the temple element may also be included in the bridge 122 and lens 150 interface. Thus, in a dual lens embodiment, each lens may include a connecting end for the temple element and one for the bridge.

Figure 6A:
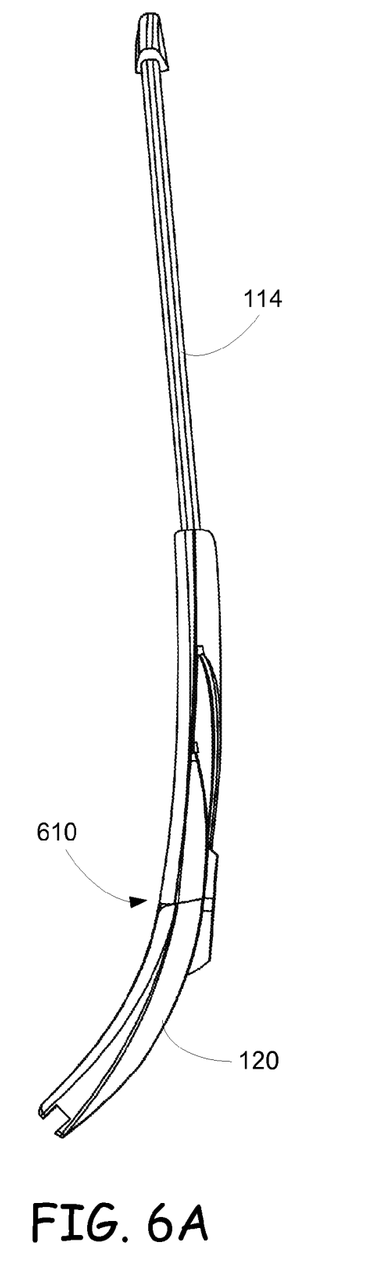
FIG. 6A is a top plan view of an exemplary temple attached to an exemplary hinge lock structure.
Figure 6B:
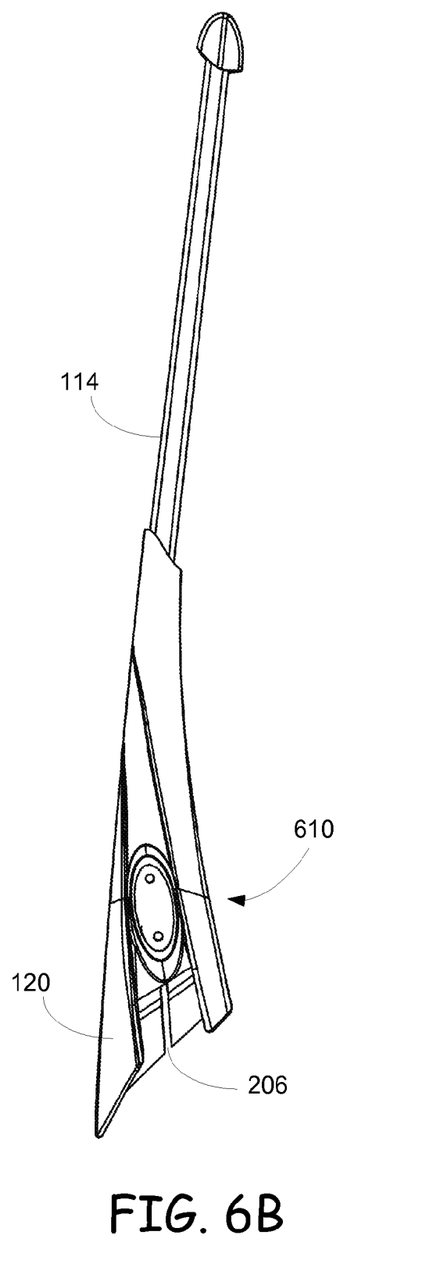
FIG. 6B is a side elevation view of the exemplary temple attached to the exemplary hinge lock structure illustrated in FIG. 6A.

FIG. 6A is a top plan view of an exemplary ear stem 114 attached to an exemplary temple lock structure 120. FIG. 6B is a side elevation view of the exemplary ear stem 114 attached to the exemplary temple lock structure 120. In the illustrated embodiment, the ear stem 114 attaches to the temple lock 120 at point 610. The mechanism for attaching the ear stem 114 to the temple lock 120 can vary from embodiment to embodiment and those skilled in the art will be familiar with the various types of connections including hinged, pinned, fixed, etc.

In the illustrated embodiments, the lens connector has been shown as being on the side or end of the lens and interfacing with the temple element. However, it will be appreciated that the lens connector may also be positioned at other locations around the perimeter of the lens. For instance, in an embodiment including a rim, the lens may include the connector element and the rim may incorporate the receptor element. Thus, in an embodiment with an upper rim, the top of the lens may include the lens connector and the underside of the upper rim may include a receptor. The lens can then be installed into the upper rim. Similarly, for embodiments having a lower rim, the lens connector can be on the bottom edge of the lens and interface to the lower rim. Thus, the lens connector can actually be located anywhere around the perimeter of the lens as long as it corresponds to a receptor.

The latches and detents have been described such that the catches of the lens connector slides past the latches, thereby displacing the receptor and allowing the latches to settle into the detents. In other embodiments, one of the detents may be replaced by a hole or aperture. In such embodiments, the receptor can be opened to receive the lens connector thereby allowing a latch to be placed through the aperture and then, the lens can be slid into the locking position as previously described. In yet another embodiment, the detents can be replaced by apertures and, when the receptor is forced open, the latches can be slid through the apertures. When the receptor is closed again, the walls of the receptor and the catches hold the lens in position.

Figure 4H:
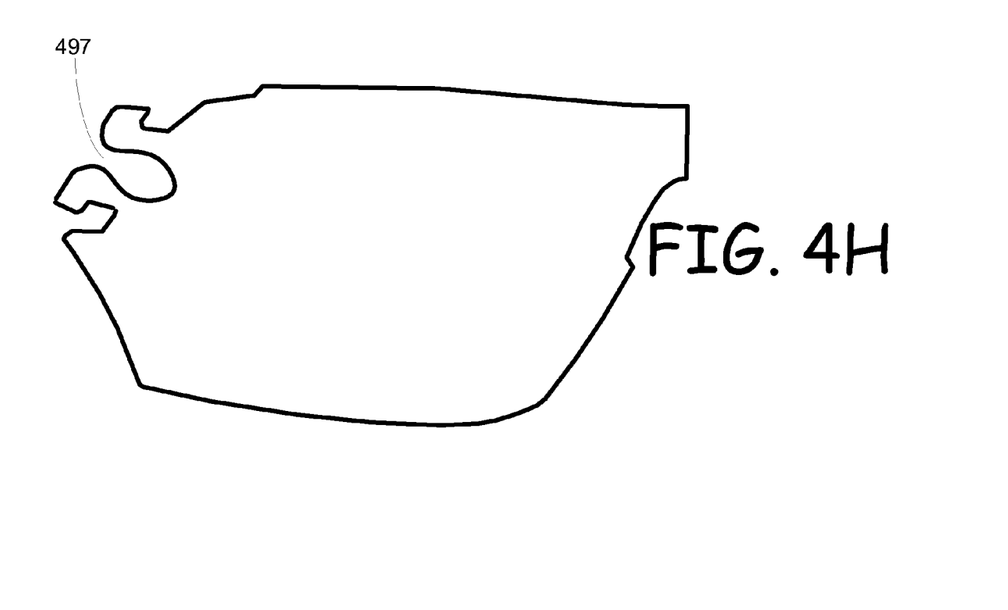

FIG. 4H illustrates another variation that can be included in other embodiments including a relief mechanism on a lens. In the illustrated embodiment, a relief mechanism is included in the lens to allow the catches to have some level of flexibility to further facilitate entry into the receptor. It should be appreciated that such an embodiment could be used along with the relief mechanism in the receptor or in lieu thereof. The illustrated relief is oval shaped and constructed of round edges to facilitate use with polycarbonate type lenses. However, in other configurations, including the kerf-like illustrates presented in FIG. 3A-3H as well as other may also be used. Further, utilizing a material for the lens that is more flexible than polycarbonate can also be deployed in various embodiments.

Figure 4I:
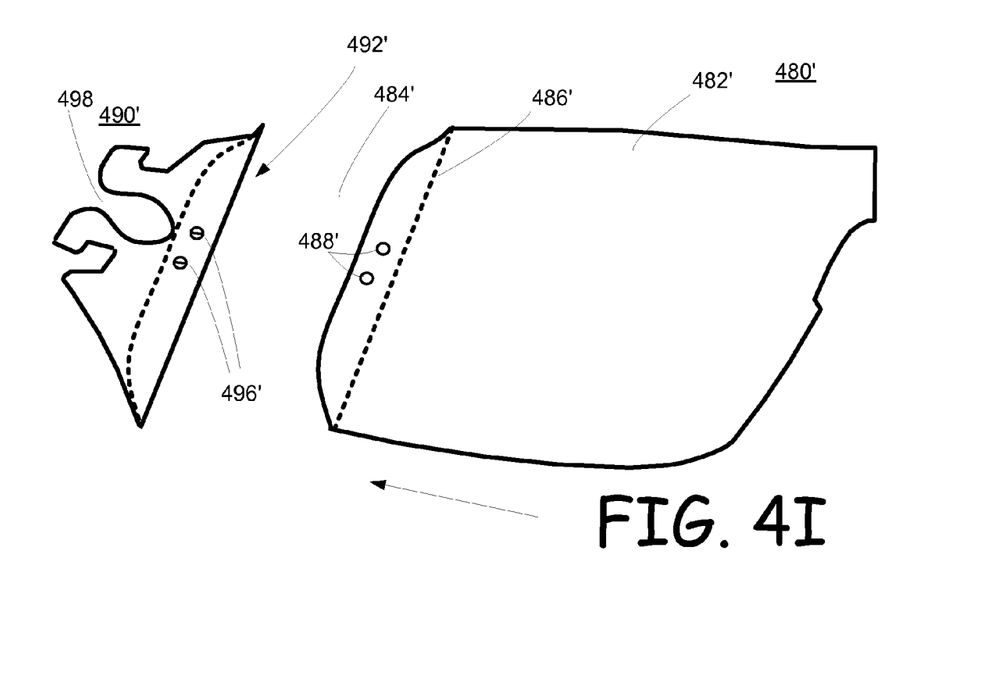

FIG. 4I also illustrates the incorporation of a relief mechanism into a two-piece lens structure in which the lens connector can be attached to the lens. In the illustrated embodiment, the attachable lens connector can include the relief mechanism as illustrated in FIG. 4H, FIGS. 3A-3H as well as others. Advantageously, in this embodiment, polycarbonate lenses can still be used and the lens connector can be constructed out of a more flexible material.

In the description and claims of the present application, each of the verbs, "comprise", "include" and "have", and conjugates thereof, are used to indicate that the object or objects of the verb are not necessarily a complete listing of members, components, elements, or parts of the subject or subjects of the verb. Further, the term pairs upper and lower, proximate and distal, forward and rear, inside and outside and other relative terms are provided solely for the purpose of describing the relationship between certain surfaces and elements and do not operate to limit the particular embodiment as the various elements, surfaces, etc. can be positioned, either by changing the view of the embodiment or the location of the various elements, surfaces, etc, such that the selected terms are not spatially correct but are still maintain the same relative positions.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art.

It will be appreciated by persons skilled in the art that the present invention is not limited by what has been particularly shown and described herein above. Rather the scope of the invention is defined by the claims that follow.

What is claimed is:

1. A receptor that can be used in conjunction with a glasses frame for receiving a lens, the receptor comprising:
    a housing that includes an inside wall and an outside wall, wherein the walls define a void for receiving a connection element of a lens;
    the housing including a relief mechanism to allow the void to be increased by displacement of at least portions of at least one of the walls;
    a first latch located within the void, the first latch corresponding to a first detent, wherein the first detent is defined by the shape of the lens and wherein the first latch provides support for holding the lens in position when the first latch is inserted into the first detent;
    a second latch located within the void, the second latch corresponding to a second detent, wherein the second detent is defined by the shape of the lens and wherein the second latch further provides support for holding the lens in position when the second latch is inserted into the second detent; and
    an ear stem receiving end and a lens receiving end, and wherein the edges of the inside wall and the outside wall at the lens receiving end define an opening into the void for receiving the connection element of the lens and, at least one of the inside and outside housing walls includes the relief mechanism which comprises at least one relief slot that runs from the lens edge of the wall and substantially towards the ear stem end of the housing for a first distance, wherein the relief slot enables an upper portion of the wall to be moved in opposing direction from a lower portion of the wall thereby increasing the size of the opening into the void.

2. The receptor of claim 1, wherein the housing is configured such that, upon placement of the connecting element of the lens into the void causing a particular one of the first and second latches to be forced toward the corresponding detent, the application of a force on the lens in the direction of the other latch causes a catch on the lens to come in contact with the other latch and force the upper portion of the wall to be moved in an opposing direction from a lower portion of the wall thereby increasing the size of the opening into the void.

3. Glasses including a receptor that enables lenses to be attached and detached, the glasses comprising:
    two ear stem elements;
    two temple elements, each temple element including an ear stem interface and a lens interface on the opposing end of the temple element from the ear stem interface, wherein each ear stem can be attached to the ear stem interface of the temple element;
    a bridge;
    a lens element that includes two connecting portions with each connecting portion corresponding to one of the temple elements;
    wherein each temple element includes a first wall and a second wall that cooperatively define an interior space and an opening into the interior space, at least one wall including a relief mechanism that enables the displacement of at least portions of the wall to increase the size of the opening into the interior space, and wherein the interior space includes at least two latches;
    wherein each connecting portion of the lens element includes at least two catches with each catch corresponding to one of the at least two latches, and at least one detent associated with a second catch;
    wherein upon placement of a first catch of the connecting portion through the opening and towards the distal side of a first latch, pressure can be applied to the lens to force the second catch toward a second latch and, wherein the contact between the second catch and the second latch causes the displacement of the second latch relative to the first latch, such that the second catch can pass to the distal side of the second latch thereby allowing the second latch to enter the detent and securing the lens element to the temple element;
    wherein the relief mechanism in at least one of the walls includes a kerf-like slot that further enables the displacement of the second latch relative to the first latch and the kerf-like slot includes a lateral slot that begins at the edge of the lens interface of the at least one exterior wall and extends towards the ear stem end of the temple element and a vertical slot that is substantially perpendicular to the lateral slot and that intersects with the lateral slot.

4. The glasses of claim 3, wherein on at least one end of the vertical slot of the kerf-like slot, the exterior wall defines a void that is substantially wider than that vertical slot.

5. The glasses of claim 4, wherein the other exterior wall includes a gap between an upper portion of the exterior wall and a lower portion of the exterior wall.

6. The glasses of claim 5, wherein the lens element includes two separate lenses with each lens including at least one connecting portion.

7. The glasses of claim 5, wherein the lens element is a unitary lens and includes two connecting portions corresponding to each temple element.

8. The glasses of claim 5, wherein the lens element can be removed from the temple element by applying pressure against the lens element in substantially the opposite direction of the pressure applied for securing the lens element in the temple element, wherein the second catch forces the second latch to move in the opposite direction from the first latch, thereby causing the second latch to exit the detent and allowing the catch to pass from the distal side of the latch to the proximate side of the latch.

9. The glasses of claim 5, wherein the interior sides of the exterior walls fit snuggly against the surface of the lens.

10. The glasses of claim 5, wherein the connecting portion of the lens is detachable from the lens.

11. The glasses of claim 6, wherein each lens includes a connection portion to the temple element and a connection portion to the bridge, and wherein the bridge comprises:

a first bridge wall and a second bridge wall that cooperatively define an interior space and an opening into the interior space, at least one wall including a relief mechanism that enables the displacement of at least portions of the wall to increase the size of the opening into the interior space, and wherein the interior space includes at least two latches.

12. The glasses of claim 6, wherein the bridge connects to each of the lenses on the opposing end from the connecting portion thereby joining the lenses together.

\* \* \* \* \*